United States Patent
Yanagisako (10) Patent No.: US 10,292,084 B2
(45) Date of Patent: May 14, 2019

(54) COMMUNICATION SYSTEM AND CONTROL METHOD

(71) Applicant: NEC Corporation, Minato-ku, Tokyo (JP)

(72) Inventor: Yoshifumi Yanagisako, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/761,461

(22) PCT Filed: Sep. 14, 2016

(86) PCT No.: PCT/JP2016/004191
§ 371 (c)(1),
(2) Date: Mar. 20, 2018

(87) PCT Pub. No.: WO2017/056425
PCT Pub. Date: Apr. 6, 2017

(65) Prior Publication Data
US 2018/0352495 A1 Dec. 6, 2018

(30) Foreign Application Priority Data
Sep. 29, 2015 (JP) .................. 2015-190572

(51) Int. Cl.
*H04W 36/32* (2009.01)
*H04W 16/18* (2009.01)
(Continued)

(52) U.S. Cl.
CPC .......... *H04W 36/32* (2013.01); *H04W 16/18* (2013.01); *H04W 24/02* (2013.01);
(Continued)

(58) Field of Classification Search
CPC . H04W 36/32; H04W 36/0083; H04W 36/08; H04W 36/30; H04W 36/00;
(Continued)

(56) References Cited

U.S. PATENT DOCUMENTS

2013/0267238 A1 10/2013 Hapsari et al.
2013/0295931 A1* 11/2013 Yu .................... H04W 36/32
455/435.1
(Continued)

FOREIGN PATENT DOCUMENTS

| JP | 2005-252623 A | 9/2005 |
|----|----|----|
| JP | 2012-129641 A | 7/2012 |
| JP | 2013-168787 A | 8/2013 |

OTHER PUBLICATIONS

3rd Generation Partnership Project (3GPP), "Digital cellular telecommunications system (Phase 2+); Universal Mobile Telecommunications System (UMTS); LTE; Telecommunication management; Subscriber and equipment trace; Trace control and configuration management", 3GPP, Jan. 2015, TS 32.422, version 12.4.0, Release 12, Sophia Antipolis Cedex France.
(Continued)

*Primary Examiner* — George Eng
*Assistant Examiner* — Jing Gao (57) ABSTRACT

A success rate of handover is improved. A communication system includes a base station and a mobile management device. The mobile management device includes first reception means for receiving speed information on a mobile terminal based on measurement information by MDT (Minimization of Driving Test), and first transmission means for transmitting a message including the speed information to the base station. The base station includes second reception means for receiving a message including the speed information and control means for performing handover control based on the speed information which is received.

6 Claims, 8 Drawing Sheets

(51) Int. Cl.
*H04W 76/27* (2018.01)
*H04W 24/02* (2009.01)
*H04W 36/00* (2009.01)

(52) U.S. Cl.
CPC ... *H04W 36/0088* (2013.01); *H04W 36/0094* (2013.01); *H04W 76/27* (2018.02)

(58) Field of Classification Search
CPC ... H04W 36/36; H04W 24/02; H04W 36/165; H04W 88/02; H04W 36/0061; H04W 88/08; H04W 24/10; H04W 36/0055; H04W 84/045; H04W 84/042; H04W 28/08; H04W 36/0094; H04W 48/20; H04W 28/18; H04W 36/0072; H04W 36/0088; H04W 36/20; H04W 36/245; H04W 36/14; H04W 36/16; H04W 36/38; H04W 48/18; H04W 4/02; H04W 4/027; H04W 76/10; H04W 36/0016; H04W 40/36; H04W 4/046; H04W 52/0206; H04W 52/40; H04W 60/04; H04W 72/085; H04W 84/047; H04W 8/24; H04W 92/12; H04W 92/20
See application file for complete search history.

(56) References Cited

U.S. PATENT DOCUMENTS

2014/0378114 A1* 12/2014 Lim ............... H04W 8/08 455/418
2015/0181596 A1* 6/2015 Sridharan ......... H04W 72/0446 455/450
2015/0373599 A1* 12/2015 Kim ............... H04W 36/0083 370/331

OTHER PUBLICATIONS

3rd Generation Partnership Project (3GPP), "LTE; Evolved Universal Terrestrial Radio Access (E-UTRA); Radio Resource Control (RRC); Protocol specification", 3GPP, Jul. 2015, TS 36.331, version 12.6.0, Release 12, Sophia Antipolis Cedex France cited in ISR.
3rd Generation Partnership Project (3GPP), "Consideration on UE speed information for MDT", China Unicorn, Aug. 13-17, 2012, 3GPP TSG RAN WG2 #79, R2-123751, Qingdao, China cited in ISR.
International Search Report for PCT Application No. PCT/JP2016/004191, dated Dec. 6, 2016.
English translation of Written opinion for PCT Application No. PCT/JP2016/004191.

* cited by examiner

COMMUNICATION SYSTEM AND CONTROL METHOD

This application is a National Stage Entry of PCT/JP2016/004191 filed on Sep. 14, 2016, which claims priority from Japanese Patent Application 2015-190572 filed on Sep. 29, 2015, the contents of all of which are incorporated herein by reference, in their entirety.

TECHNICAL FIELD

The present invention relates to a communication system and a control method.

BACKGROUND ART

In LTE (Long Term Evolution) scheme, MDT (Minimization of Driving Test) is defined (NPL 1).

Techniques related to such MDT measurement are described in PTL 1. The PTL 1 describes a method for starting the MDT measurement only when a subject mobile station (mobile terminal) is permitted to perform MDT measurement processing.

When the mobile terminal moves, handover is performed. Techniques related to this handover are described in PTL 2 and 3. For example, PTL 2 describes a mobile terminal that switches connection to a handover destination radio base station based on a current position of the mobile terminal.

PTL 3 describes that behavior of an owner of a wireless terminal is estimated by calculating moving speed of the owner of the wireless terminal by using information on the wireless terminal acquired by a base station.

CITATION LIST

Patent Literature

[PTL 1] JP 2012-129641 A
[PTL 2] JP 2005-252623 A
[PTL 3] JP 2013-168787 A

Non Patent Literature

[NPL 1] 3GPP TS32. 422 V12. 4. 0 (2014-12)

SUMMARY OF INVENTION

Technical Problem

The moving speed of the mobile terminal is estimated from the movement history of the cell in the technique related to each of the documents mentioned above. In such estimation, there is a difference from the actual moving speed, and estimation accuracy is often low. Therefore, there is a problem in that the handover success rate decreases in handover using such moving speed with low estimation accuracy.

The present invention has been made in view of the above problem, and an object of the present invention is to provide a technique for improving a success rate of handover.

Solution to Problem

A communication system according to an aspect of the present invention includes a base station and a mobile management device, wherein the mobile management device includes first reception means for receiving speed information on a mobile terminal based on measurement information by MDT (Minimization of Driving Test), and first transmission means for transmitting a message including the speed information to the base station, and the base station includes second reception means for receiving a message including the speed information, and control means for executing handover control based on the speed information which is received.

A control method according to an aspect of the present invention is a control method of a communication system including a base station and a mobile management device, wherein the mobile management device receives speed information on a mobile terminal based on measurement information with MDT (Minimization of Driving Test), and transmits a message including the speed information to the base station, wherein the base station receives the message including the speed information, and executes handover control based on the speed information which is received.

Advantageous Effects of Invention

According to the present invention, success rate of handover can be improved.

DESCRIPTION OF EMBODIMENTS

First Example Embodiment

Figure 1:
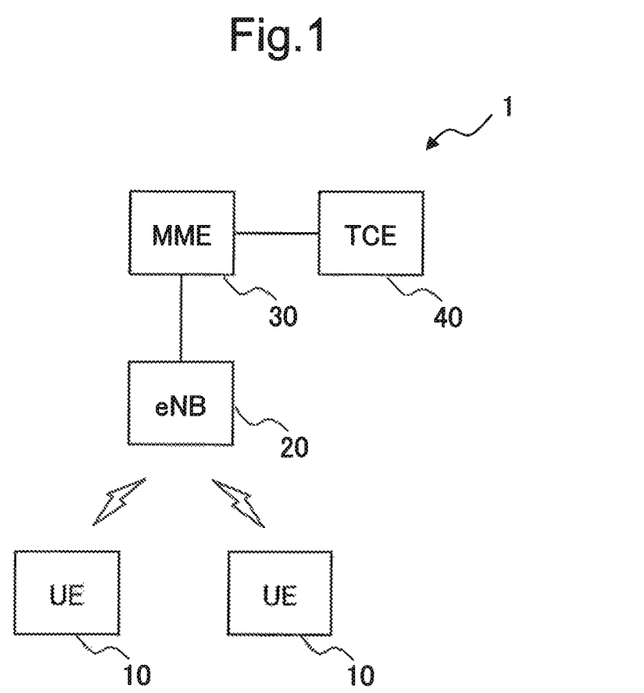
FIG. 1 illustrates an example of overall configuration of a communication system according to a first example embodiment of the present invention.

The first example embodiment of the present invention will be described in detail with reference to the drawings. FIG. 1 illustrates an example of a configuration of communication system 1 according to this example embodiment. The communication system 1 illustrated in FIG. 1 is a communication system such as a cellular phone communication network based on a standard like LTE (Long Term Evolution), for example.

As illustrated in FIG. 1, the communication system 1 according to this example embodiment includes a user equipment (mobile terminal) 10, a base station 20, a mobile management device 30, and a trace collection server 40. Hereinafter, the user equipment 10 is also referred to as a UE (User Equipment) 10, and the base station 20 is also referred to as an eNB (eNodeB) 20. The mobile management device 30 is also referred to as MME (Mobility Management Entity) 30, and the trace collection server 40 is also referred to as TCE (Trace Collection Entity) 40.

Figure 2:
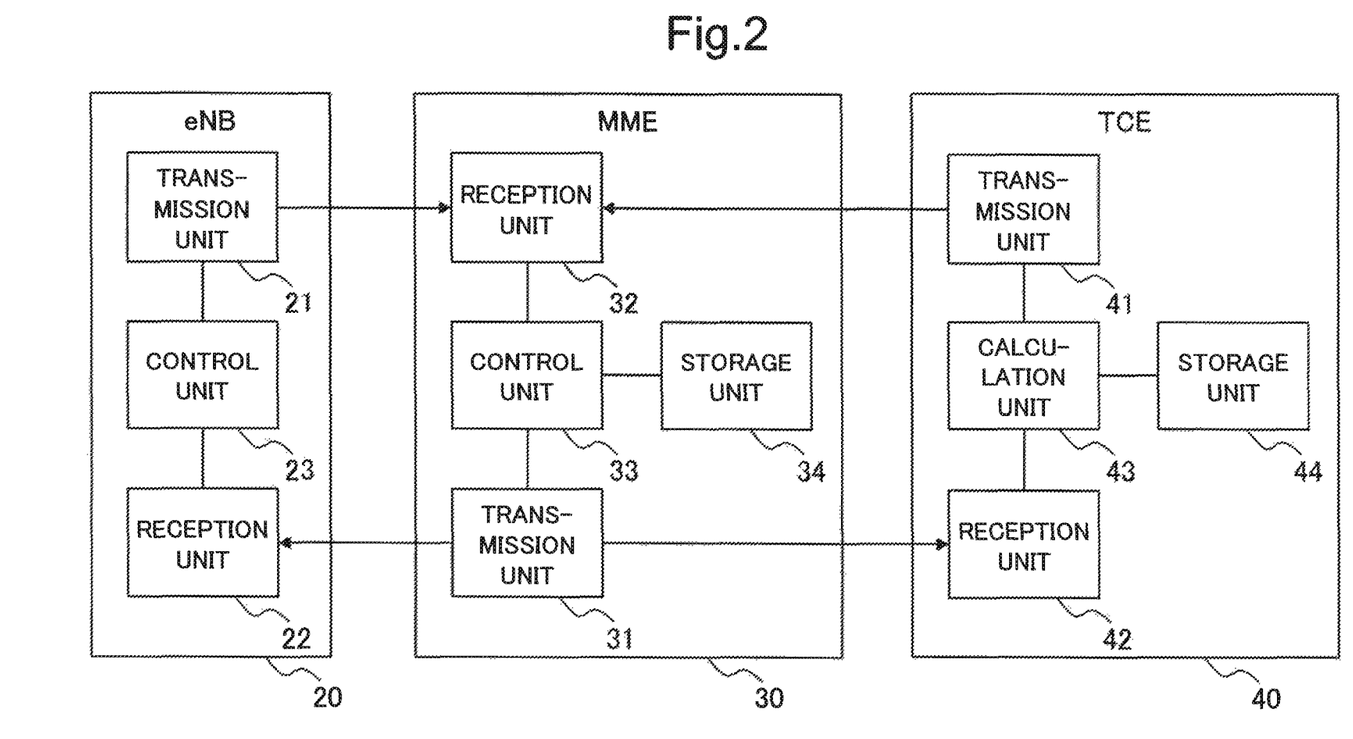
FIG. 2 is a functional block diagram illustrating an example of a functional configuration of a base station, a mobile management device, and a trace collection server of the communication system according to the first example embodiment of the present invention.

FIG. 2 is a functional block diagram illustrating an example of functional configuration of the base station 20, the mobile management device 30, and the trace collection server 40 of the communication system 1 according to this example embodiment. As illustrated in FIG. 2, the base station 20 includes a transmission unit 21, a reception unit 22, and a control unit 23. In addition, the mobile management device 30 includes a transmission unit 31, a reception unit 32, a control unit 33 and a storage unit 34. The trace collection server 40 includes a transmission unit 41, a reception unit 42, and a calculation unit 43 and a storage unit 44. Note that the base station 20, the mobile management device 30, and the trace collection server 40 in the communication system 1 illustrated in FIG. 2 illustrate the configuration particular to this example embodiment. Therefore, it should be understood that the base station 20, the mobile management device 30, and the trace collection server 40 illustrated in FIG. 2 may include a member not illustrated in FIG. 2.

(Base Station 20)

The transmission unit 21 in the base station 20 transmits a signal such as, for example, an initial UE message (Initial UE Message) to the mobile management device 30. In addition, the transmission unit 21 transmits a signal such as an RRC (Radio Resource Control) Connection Reconfiguration (RRC Connection Reconfiguration) message to the user equipment 10.

The reception unit 22 in the base station 20 receives a signal such as RCC Connection Request (RRC Connection Request) from the user equipment 10. The reception unit 22 receives a signal such as an Initial Context Setup Request (Initial Context Setup Request) from the mobile management device 30.

A signal transmitted by the transmission unit 21 to the user equipment 10 or the mobile management device 30, and a signal that the reception unit 22 receives from the user equipment 10 or the mobile management device 30, will be described later using a sequence diagram.

The control unit 23 in the base station 20 controls the entire base station 20. For example, when the reception unit 22 receives a certain request, the control unit 23 controls the transmission unit 21 so as to transmit a response to the request to the transmission source of the request.

(Mobile Management Device 30)

The transmission unit 31 in the mobile management device 30 transmits a signal such as an Initial Context Setup Request to the base station 20. In addition, the transmission unit 31 transmits, for example, a speed prediction value inquiry message to be described later to the trace collection server 40.

The reception unit 32 in the mobile management device 30 receives a signal such as initial UE message from the base station 20. The reception unit 32 also receives a speed prediction value response message from the trace collection server 40.

The signal transmitted by the transmission unit 31 to the base station 20 or the trace collection server 40, and the signal received by the reception unit 32 from the base station 20 or the trace collection server 40, will be described later using a sequence diagram.

The storage unit 34 in the mobile management device 30 stores data (also referred to as a table) in which the S1-ID and the IMSI (International Mobile Subscriber Identity) of the user equipment 10 are associated with each other.

The control unit 33 in the mobile management device 30 controls the entire mobile management device 30. For example, when the reception unit 32 receives a certain request, the control unit 33 performs control to execute processing according to the request. For example, when the reception unit 32 receives an initial UE message from the base station 20, the control unit 33 refers to the table stored in the storage unit 34 using the S1-ID included in the initial UE message. Then, the control unit 33 identifies the IMSI associated with the S1-ID. Then, the control unit 33 instructs the transmission unit 31 to transmit a speed prediction value inquiry message including this IMSI to the trace collection server 40.

For example, when the reception unit 32 in the control unit 33 receives the speed prediction value response message from the trace collection server 40, the control unit 33 sets a speed prediction value included in this speed prediction value response message as an information element (IE: Information Element) of the Initial Context Setup Request. Then, the control unit 33 instructs the transmission unit 31 to transmit this initial context setup request to the base station 20.

(Trace Collection Server 40)

The transmission unit 41 in the trace collection server 40 transmits a response (speed prediction value response message) for the speed prediction value inquiry message to the mobile management device 30.

As described in the NPL1, the reception unit 42 in the trace collection server 40 receives the measurement information by Logged MDT or Immediate MDT reported from the user equipment 10. The reception unit 42 stores the received measurement information in the storage unit 44. The reception unit 42 also receives a speed prediction value inquiry message from the mobile management device 30.

The storage unit 44 in the trace collection server 40 stores measurement information provided by the Logged MDT or the Immediate MDT. This measurement information is managed for each IMSI. This measurement information includes position information on the user equipment 10 at a predetermined time.

The calculation unit 43 calculates a speed prediction value (speed information) of the user equipment 10 identified by the IMSI based on the IMSI measurement information included in the speed prediction value inquiry message received by the reception unit 42. More specifically, the calculation unit 43 extracts, by using IMSI that identifies the user equipment 10 to which the speed prediction value is calculated, the measurement information of the user equipment 10 identified by the IMSI stored in the storage unit 44. Then, the calculation unit 43 predicts the speed of the user equipment 10 at the present time based on the extracted measurement information, and calculates the information indicating the predicted speed as the speed prediction value. This speed prediction value may be represented by numerical value data, such as the speed of user equipment 10, or may be a mapped value (for example, High/Medium/Low, and the like) from a numerical value data such as a speed or the like.

Here, a calculation method of the speed prediction value by the calculation unit 43 will be described. It should be noted that the calculation method of the speed prediction value described below is merely an example, and the speed prediction value calculated by the calculation unit 43 in this example embodiment is not limited to thereto.

First, for example, the calculation unit 43 predicts the speed of the user equipment 10 from the current time to the predetermined time later based on the measurement information. For example, the calculation unit 43 specifies the measurement information similar to the current date (weekday, holiday, day of the week, and the like) and the time zone by using the information of the date and time included in the measurement information. Then, the calculation unit 43 predicts the speed of the user equipment 10 from the current time to the predetermined time later based on the identified measurement information. In this case, the calculation unit 43 may set, among the speeds calculated using the specified measurement information, maximum speed as the speed prediction value or average speed as the speed prediction value.

(Hardware Configuration)

Figure 3:
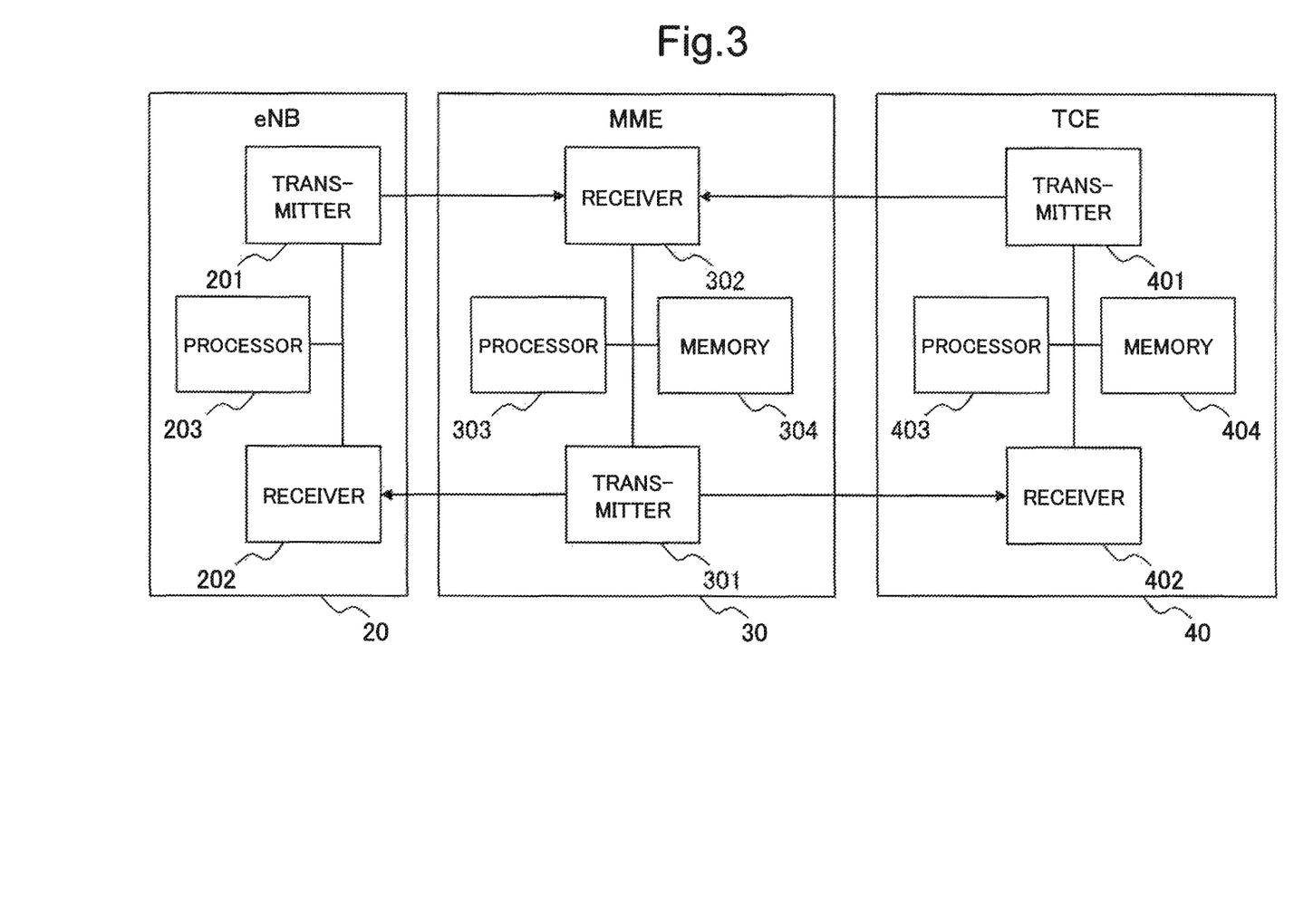
FIG. 3 is a block diagram illustrating an example of a hardware configuration of the base station, the mobile management device, and the trace collection server of the communication system according to the first example embodiment of the present invention.

FIG. 3 illustrates an example of a hardware configuration of the base station 20, the mobile management device 30, and the trace collection server 40 in the communication system 1 according to this example embodiment. As illustrated in FIG. 3, the base station 20 includes a transmitter 201, a receiver 202, and a processor 203. The mobile management device 30 also includes a transmitter 301, a receiver 302, a processor 303 and memory 304. The trace collection server 40 includes a transmitter 401, a receiver 402, a processor 403, and memory 404. The base station 20, the mobile management device 30, and the trace collection server 40 in the communication system 1 illustrated in FIG. 3 illustrate a configuration particular to this example embodiment. Therefore, it should be noted that the base station 20, the mobile management device 30, and the trace collection server 40 illustrated in FIG. 3 may include an element not illustrated in FIG. 3.

The transmission unit 21 in the base station 20 described above is implemented by the transmitter 201. The reception unit 22 in the base station 20 is implemented by the receiver 202. The control unit 23 in the base station 20 is implemented by the processor 203. It should be noted that the transmitter 201 and the receiver 202 in the base station 20 can also operate together as a transmitter/receiver or transmission/reception circuit.

The transmission unit 31 in the mobile management device 30 described above is implemented by the transmitter 301. The reception unit 32 in the mobile management device 30 is implemented by the receiver 302. The control unit 33 in the mobile management device 30 is implemented by the processor 303. The storage unit 34 in the mobile management device 30 is implemented by the memory 304. It should be noted that the transmitter 301 and receiver 302 in the mobile management device 30 can also operate together as a transmitter/receiver or transmission/reception circuit.

The transmission unit 41 in the trace collection server 40 described above is implemented by the transmitter 401. The reception unit 42 in the trace collection server 40 is implemented by the receiver 402. The calculation unit 43 in the trace collection server 40 is implemented by the processor 403. The storage unit 44 in the trace collection server 40 is implemented by the memory 404. It should be noted that the transmitter 401 and the receiver 402 in the trace collection server 40 can also operate together as a transmitter/receiver or a transmission/reception circuit.

(Operation of Communication System 1)

Figure 4:
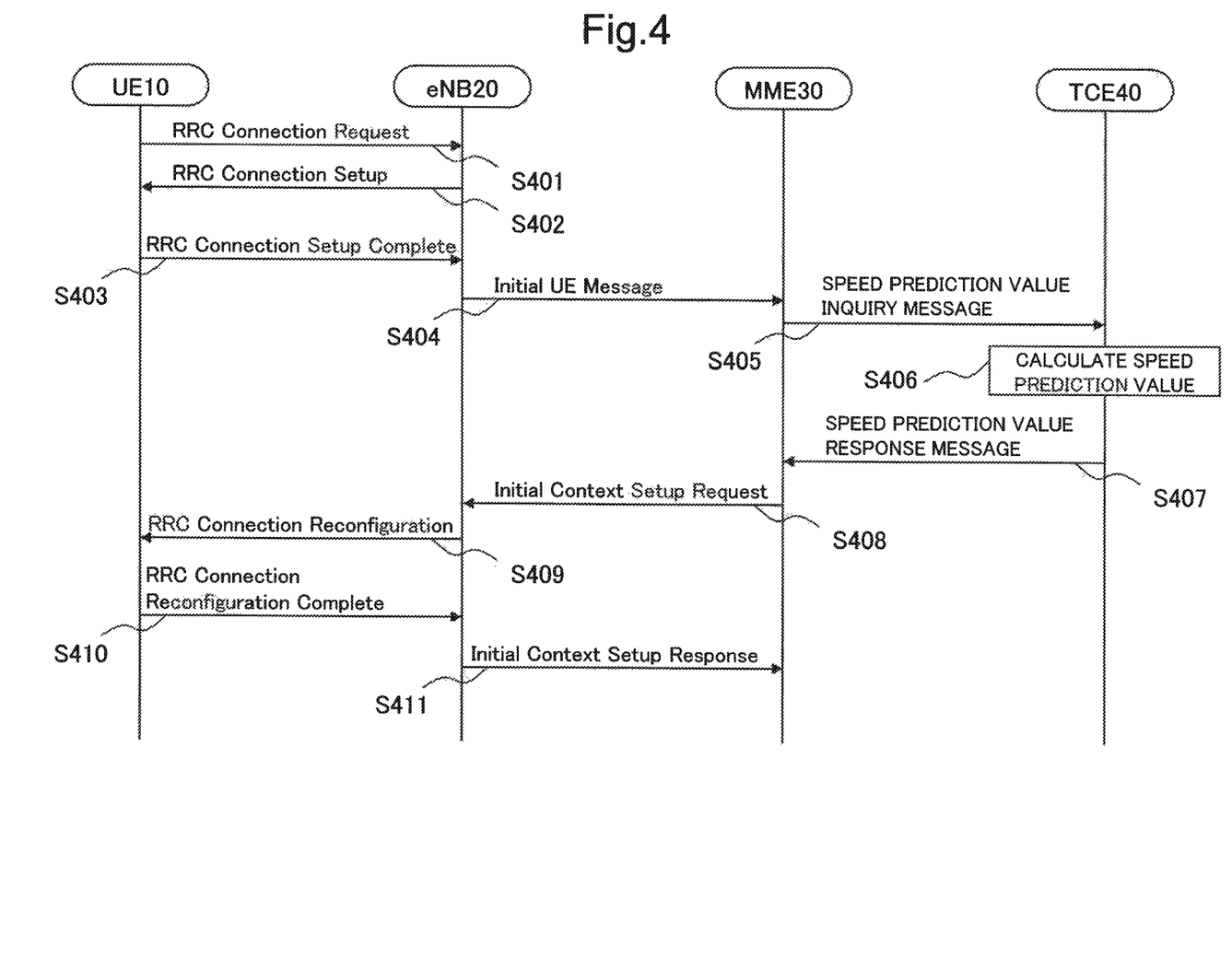
FIG. 4 is a sequence diagram illustrating an example of operation of the communication system according to the first example embodiment of the present invention.

Next, the operation of the communication system 1 will be described with reference to FIG. 4 to FIG. 7. FIG. 4 to FIG. 7 are sequence diagrams respectively illustrating the operation of the communication system 1 according to this example embodiment. The sequence diagram of FIG. 4 illustrates a flow when the base station 20 determines a measurement configuration information according to the moving speed of the user equipment 10 at the time of establishing an RRC connection.

As illustrated in FIG. 4, the user equipment 10 first transmits an RRC Connection Request (RRC Connection Request) to the base station 20 (step S401). When the reception unit 22 in the base station 20 receives the RRC connection request, the transmission unit 21 returns an RRC Connection Setup notification (RRC Connection Setup) to the user equipment 10 (step S402). Thereafter, the user equipment 10 transmits an RRC Connection Setup Complete notification (RRC Connection Setup Complete) to the base station 20 for registration processing to the network (step S403). This establishes an RRC connection.

When the RRC connection is established, the transmission unit 21 in the base station 20 transmits an initial UE message (Initial UE Message) to the mobile management device 30 (step S404). When the reception unit 32 in the mobile management device 30 receives the initial UE message, the control unit 33 refers to the table stored in the storage unit 34 using the S1-ID included in the initial UE message, and identifies the IMSI of the user equipment 10 that transmitted the RRC connection request in step S401. Then, the transmission unit 31 in the mobile management device 30 inquires the trace collection server 40 regarding a speed prediction value for the identified IMSI (target IMSI) at the time when the initial UE message is received (step S405). In other words, the transmission unit 31 in the mobile management device 30 transmits a speed prediction value inquiry message to the trace collection server 40. This speed prediction value inquiry message includes the target IMSI.

When the reception unit 42 in the trace collection server 40 receives the speed prediction value inquiry message from the mobile management device 30, the calculation unit 43 calculates the speed prediction value of the target IMSI included in the speed prediction value inquiry message (step S406). The transmission unit 41 in the trace collection server 40 transmits a message including the above-described speed prediction value to the mobile management device 30 as a response (speed prediction value response message) to the speed prediction value inquiry message (step S407).

The control unit 33 in the mobile management device 30 sets the speed prediction value included in the speed prediction value response message received by the reception unit 32 from the trace collection server 40 as the IE of the Initial Context Setup Request (Initial Context Setup Request). The transmission unit 31 in the mobile management device 30 transmits this Initial Context Setup Request to the base station 20 (step S408).

The reception unit 22 in the base station 20 receives an Initial Context Setup Request from the mobile management device 30. Thereafter, the control unit 23 in the base station 20 determines a measurement configuration information (Measurement Configuration) necessary for terminal measurement in accordance with the speed prediction value included in the Initial Context Setup Request as the IE. Then, the transmission unit 21 in the base station 20 transmits an RRC Connection Reconfiguration (RRC Connection Reconfiguration) message including this measurement configuration information to the user equipment 10 (step S409). The RRC Connection Reconfiguration message includes, for example, the following measurement configuration information (A) to (C).

(A) Threshold value to be satisfied when the UE 10 reports RSRQ (Reference Signal Received Quality), RSRP (Reference Signal Received Power) to the eNB, (B) Information on cells to be set as neighbor cells, (C) Information on handover parameters such as Time to Trigger (TTT)

The above (B) is information, for example, indicating that small cell (small cell) is not included in a cell set as the neighbor cells. The above (C) is information indicating the time of TTT longer than the present time. It should be noted that the information included in the measurement configuration information is not limited to the above (A) to (C).

Thereafter, the user equipment 10 transmits a response (RRC Connection Reconfiguration Complete) to the RRC Connection Reconfiguration message to the base station 20 (step S410). Then, the transmission unit 21 in the base station 20 transmits an Initial Context Setup Request response (Initial Context Setup Response) to the mobile management device 30 (step S411).

With the above operation, the base station 20 can acquire the speed prediction value of the user equipment 10 to be the acquisition target of the measurement information. The base station 20 determines the measurement configuration information in accordance with the moving speed of the user equipment 10, and transmits this measurement configuration information in the RRC Connection Reconfiguration message to the user equipment 10. As a result, the user equipment 10 and the base station 20 can execute RRC connection in accordance with the moving speed of the user equipment 10. In addition, the user equipment 10 can execute MDT measurement processing based on the measurement configuration information in accordance with the speed of the user equipment 10.

Figure 5:
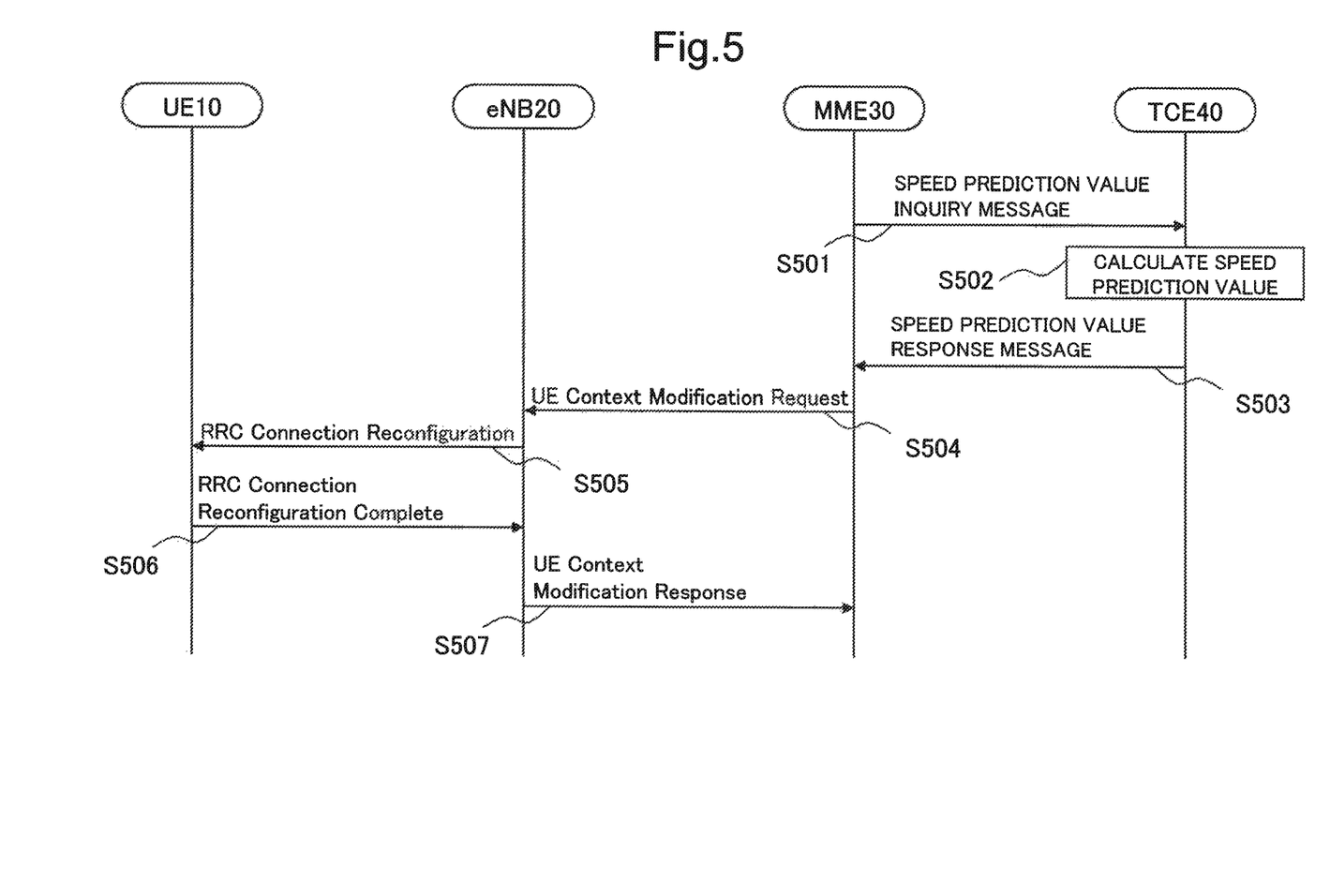
FIG. 5 is a sequence diagram illustrating an example of the operation of the communication system according to the first example embodiment of the present invention.

Next, the operation of the communication system 1 will be described with reference to FIG. 5. The sequence diagram of FIG. 5 illustrates a flow when the mobile management device 30 periodically transmits the speed prediction value inquiry message to the trace collection server 40.

The transmission unit 31 in the mobile management device 30 periodically transmits a speed prediction value inquiry message to the trace collection server 40 (step S501). The trace collection server 40 that has received this speed prediction value inquiry message calculates a speed prediction value (step S502) and transmits a speed prediction value response message (step S503). Since the above-described steps S501 to S503 are the similar operations as the above-described steps S405 to S407, respectively, the detailed description thereof will be omitted.

Thereafter, the reception unit 32 in the mobile management device 30 receives the speed prediction value response message transmitted from the trace collection server 40. The control unit 33 in the mobile management device 30 then determines whether the speed prediction value included in the speed prediction value response message is equal to the speed prediction value included in the speed prediction value response message received in the past. Then, when the speed prediction value is different (the speed prediction value has changed), the transmission unit 31 transmits a UE context modification request (UE Context Modification Request) including the speed prediction value received from the trace collection server 40 as an IE (step S504). Note that, if the speed prediction value is, for example, speed, the control unit 33 may determine that the speed prediction value is different when the speed difference is greater than or equal to a predetermined threshold value.

When the reception unit 22 in the base station 20 receives the UE context modification request from the mobile management device 30, the control unit 23 in the base station 20 determines the measurement configuration information necessary for the terminal measurement in accordance with the speed prediction value included in the UE context modification request as the IE. The transmission unit 21 in the base station 20 transmits an RRC Connection Reconfiguration message including the measurement configuration information to the user equipment 10 (step S505). The RRC Connection Reconfiguration message includes the measurement configuration information (A) to (C) described above.

Thereafter, the user equipment 10 transmits a response (RRC Connection Reconfiguration Complete) to the RRC Connection Reconfiguration message to the base station 20 (step S506). Then, the transmission unit 21 in the base station 20 transmits, to the mobile management device 30, a response (UE Context Modification Response) to the UE context modification request (step S507).

With the above operation, the mobile management device 30 can notify the base station 20 that the moving speed of the user equipment 10 has changed. The base station 20 determines the measurement configuration information each time the moving speed of the user equipment 10 changes, and transmits this measurement configuration information by including it in the RRC Connection Reconfiguration message to the user equipment 10. As a result, the user equipment 10 and the base station 20 can execute RRC connection according to the moving speed of the user equipment 10. In addition, the user equipment 10 can execute MDT measurement processing based on the measurement configuration information corresponding to the speed of the user equipment 10.

The base station 20 may periodically transmit a message inquiring the speed prediction value to the mobile management device 30. The mobile management device 30 may then execute step S501 in response to this message. In this case, the mobile management device 30 may execute step S504 as a response to the message without determining whether or not the speed prediction value has changed.

With the above configuration, the base station 20 can acquire the speed prediction value of the target user equipment 10 at any timing.

Figure 6:
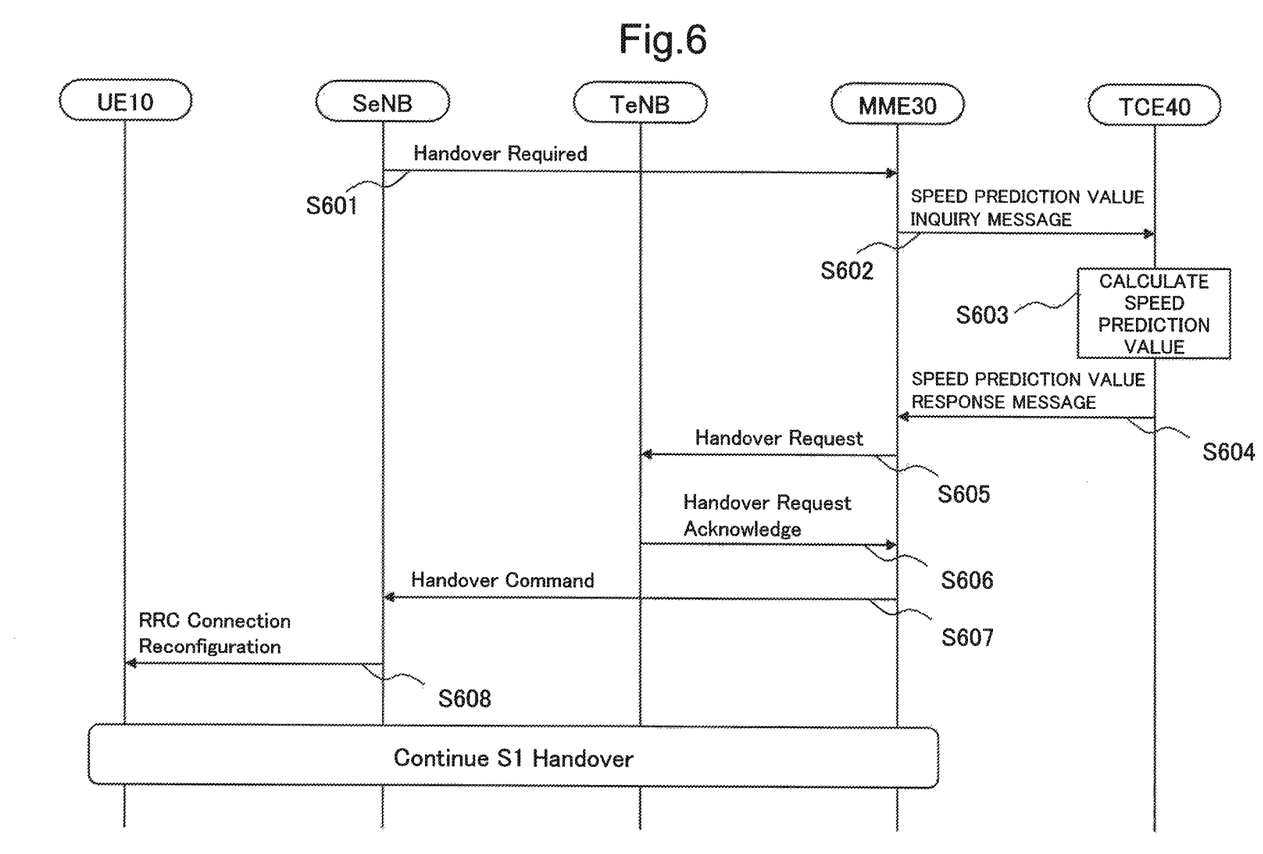
FIG. 6 is a sequence diagram illustrating an example of the operation of the communication system according to the first example embodiment of the present invention.

Next, the operation of the communication system 1 will be described with reference to FIG. 6. The sequence diagram in FIG. 6 illustrates a flow of operation of the communication system 1 during S1 handover. In FIG. 6, the handover source base station 20 among the base station 20 is called SeNB (Source eNodeB), and the handover destination base station 20 is called TeNB (Target eNodeB). Here, as described with reference to FIG. 4 and FIG. 5, it is assumed that an RRC connection in accordance with the moving speed of the user equipment 10 is established between the user equipment 10 and the base station 20.

The SeNB executes handover based on the speed prediction value included in either the Initial Context Setup Request transmitted in step S408 or the UE context modification request transmitted in step S504. More specifically, the SeNB transmits a handover required (Handover required) message to the mobile management device 30 (step S601). In this step, SeNB transmits the speed prediction value (speed information) received in step S408 or step S504 related to the user equipment 10 to be a target of handover by including it in the handover required message.

When the reception unit 32 in the mobile management device 30 receives the handover required message, the control unit 33 refers to the table stored in the storage unit 34 using the S1-ID indicating the user equipment 10 to be the target of handover to identify the IMSI of user equipment 10. Then, the transmission unit 31 in the mobile management device 30 transmits, to the trace collection server 40, a speed prediction value inquiry message on the identified IMSI (target IMSI) at the time of receiving the handover required message (step S602). This speed prediction value inquiry message includes the target IMSI.

The trace collection server 40 that has received this speed prediction value inquiry message calculates a speed prediction value (step S603), and transmits a speed prediction value response message (step S604). Since the above-described steps S602 to S604 are similar to the above-described steps S405 to S407, a detailed description thereof will be omitted.

When the reception unit 32 in the mobile management device 30 receives the speed prediction value response message, the transmission unit 31 transmits, to the TeNB, a handover request (Handover Request) instructing the S1 handover to the user equipment 10 to be the target of handover (step S605). In this step, the transmission unit 31 includes the speed prediction value, which is included in the speed prediction value response message, as the IE into the handover request. The transmission unit 31 also includes the S1-ID of the user equipment 10 to be the target of handover into the handover request. When the handover request is transmitted to the TeNB before executing step S602 to step S604, the mobile management device 30 may transmit the speed prediction value included in the handover required message in step S601 by including it in the handover request. As a result, the SeNB can notify the TeNB of the speed prediction value of the acquired user equipment 10.

The reception unit 22 in the TeNB receives a handover request from the mobile management device 30. The TeNB can identify the user equipment 10 to be the target of handover according to the S1-ID included in this handover request. The control unit 23 in the TeNB determines the measurement configuration information (Measurement Configuration) necessary for the terminal measurement according to the speed prediction value included as the IE in the handover request. Then, the transmission unit 21 in the TeNB transmits a handover request response (Handover Request Acknowledge) including this measurement configuration information to the mobile management device 30 (step S606).

When the reception unit 32 in the mobile management device 30 receives a handover request response, the transmission unit 31 transmits a handover command (Handover Command) to the SeNB (step S607). In this step, the transmission unit 31 includes the measurement configuration information, which is included in the handover request response, into the handover command.

When the reception unit 22 in the SeNB receives the handover command, the transmission unit 21 transmits an RRC Connection Reconfiguration message prompting change of the connection destination of the RRC to the user equipment 10 (step S608). In this step, the transmission unit 21 includes the measurement configuration information included in the handover command into the RRC Connection Reconfiguration message. The RRC Connection Reconfiguration message includes, for example, the measurement configuration information (A) to (C) described above.

Then, the communication system 1 continues processing concerning the S1 handover according to the moving speed of the user equipment 10.

With the above processing, the base station 20 can execute S1 handover to the target user equipment 10. Further, the user equipment 10 can execute an RRC connection based on the TeNB and the measurement configuration information determined according to the moving speed of the user equipment 10.

Figure 7:
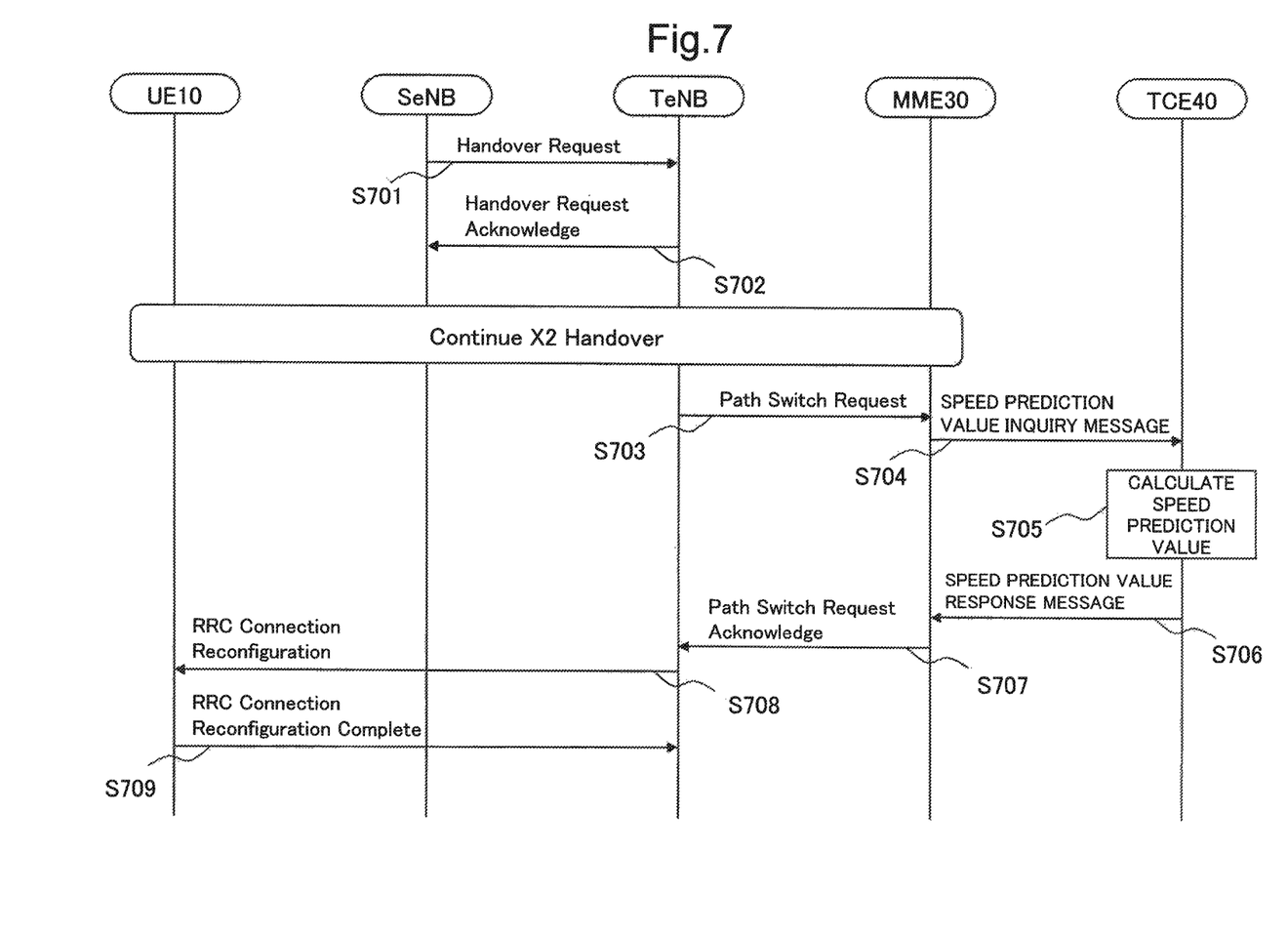
FIG. 7 is a sequence diagram illustrating an example of the operation of the communication system according to the first example embodiment of the present invention.

Next, the operation of the communication system 1 will be described with reference to FIG. 7. The sequence diagram in FIG. 7 illustrates a flow of the communication system 1 operation during X2 handover. In FIG. 7, as in FIG. 6, the handover source base station 20 is referred to as SeNB, and the handover destination base station 20 is referred to as TeNB.

The SeNB activates handover based on the speed prediction value included in either the Initial Context Setup Request transmitted in step S408 described above or the UE context modification request transmitted in step S504. More specifically, the SeNB transmits a handover request (Handover Request) to the TeNB (step S701). In this step, the SeNB transmits the speed prediction value (speed information) received in the step S408 or the step S504 concerning the user equipment 10 to be the target of handover and the S1-ID indicating the user equipment 10 to be the target of handover by including them in the handover request. As a result, the SeNB can notify the TeNB of the speed prediction value of the user equipment 10.

When the reception unit 22 in the TeNB receives the handover request, the transmission unit 21 in the TeNB transmits a handover request response (Handover Request Acknowledge) to the SeNB (step S702).

Then, the communication system 1 continues processing concerning X2 handover according to the moving speed of the user equipment 10.

Thereafter, the transmission unit 21 in the TeNB transmits a path switching request (Path Switch Request) to the mobile management device 30 (step S703).

When the reception unit 32 in the mobile management device 30 receives the path switching request, the transmission unit 31 transmits the speed prediction value inquiry message to the trace collection server 40 (step S704). The trace collection server 40 that has received this speed prediction value inquiry message calculates a speed prediction value (step S705), and transmits a speed prediction value response message (step S706). The above-described steps S704 to S706 are the same operations as the above-described steps S405 to S407, respectively, thus a detailed description thereof will be omitted.

When the reception unit 32 in the mobile management device 30 receives the speed prediction value response message, the transmission unit 31 transmits a response of the path switching request (Path Switch Request Acknowledge) to the TeNB (step S707). In this step, the transmission unit 31 includes the speed prediction value, which is included in the speed prediction value response message, into the response to the path switching request.

When the reception unit 22 in the TeNB receives the response to the path switching request, the control unit 23 determines the measurement configuration information (Measurement Configuration) necessary for the terminal measurement according to the speed prediction value included in the response to the path switching request. Then, the transmission unit 21 of TeNB transmits an RRC Connection Reconfiguration message (RRC Connection Reconfiguration) including the measurement configuration information of (A) to (C) described above (step S708).

Thereafter, the user equipment 10 transmits a response to the RRC Connection Reconfiguration message (RRC Connection Reconfiguration Complete) to the TeNB (step S709).

With the above operation, the base station 20 can execute handover according to the moving speed of the user equipment 10.

Note that after the end of step S701, i.e., when the reception unit 22 in the TeNB receives a handover request from the SeNB, the control unit 23 may determine the measurement configuration information necessary for the terminal measurement according to the speed prediction value included in the handover request. Further, when the mobile management device 30 transmits the response of the path switching request to the TeNB before receiving the speed prediction value response message, the transmission unit 21 in the TeNB may transmit the RRC Connection Reconfiguration message including the determined measurement configuration information to the user equipment 10. With this configuration, the user equipment 10 can execute MDT measurement processing via the base station 20 (TeNB) after handover.

Advantageous Effect

As described above, the communication system 1 according to this example embodiment transmits a message (for example, Initial Context Setup Request) including, as IE, the speed prediction value (speed information) received by the mobile management device 30 from the trace collection server 40 to the base station 20. Then, the base station 20 executes handover control based on this speed prediction value. As a result, the communication system 1 according to this example embodiment can execute handover according to moving speed.

For example, when a user equipment with fast moving speed is connected to a base station that covers a small range such as small cell or pico cell in HetNet (Heterogeneous Network), it is necessary to execute handover frequently. In this case, handover may fail, or the success rate of the handover decreases since synchronization with the base station 20 may not be established.

In contrast, since the communication system 1 according to this example embodiment executes handover according to the moving speed of the user equipment 10, for example, it is possible to execute control such as not connecting the user equipment 10 with fast moving speed to the base station covering a narrow range. As a result, the success rate of handover can be improved. In addition, since the communication system 1 can execute control so that the user equipment 10 frequently executes handover, it is possible to reduce the amount of signal to be communicated.

Second Example Embodiment

Next, the communication system 1 according to this example embodiment will be described with reference to FIG. 8. This example embodiment describes a communication system 1 with the minimum configuration to solve the problem of the present invention. The overall structure of the communication system 1 is similar to that of the communication system 1 illustrated in FIG. 1, and thus description thereof will be omitted.

Figure 8:
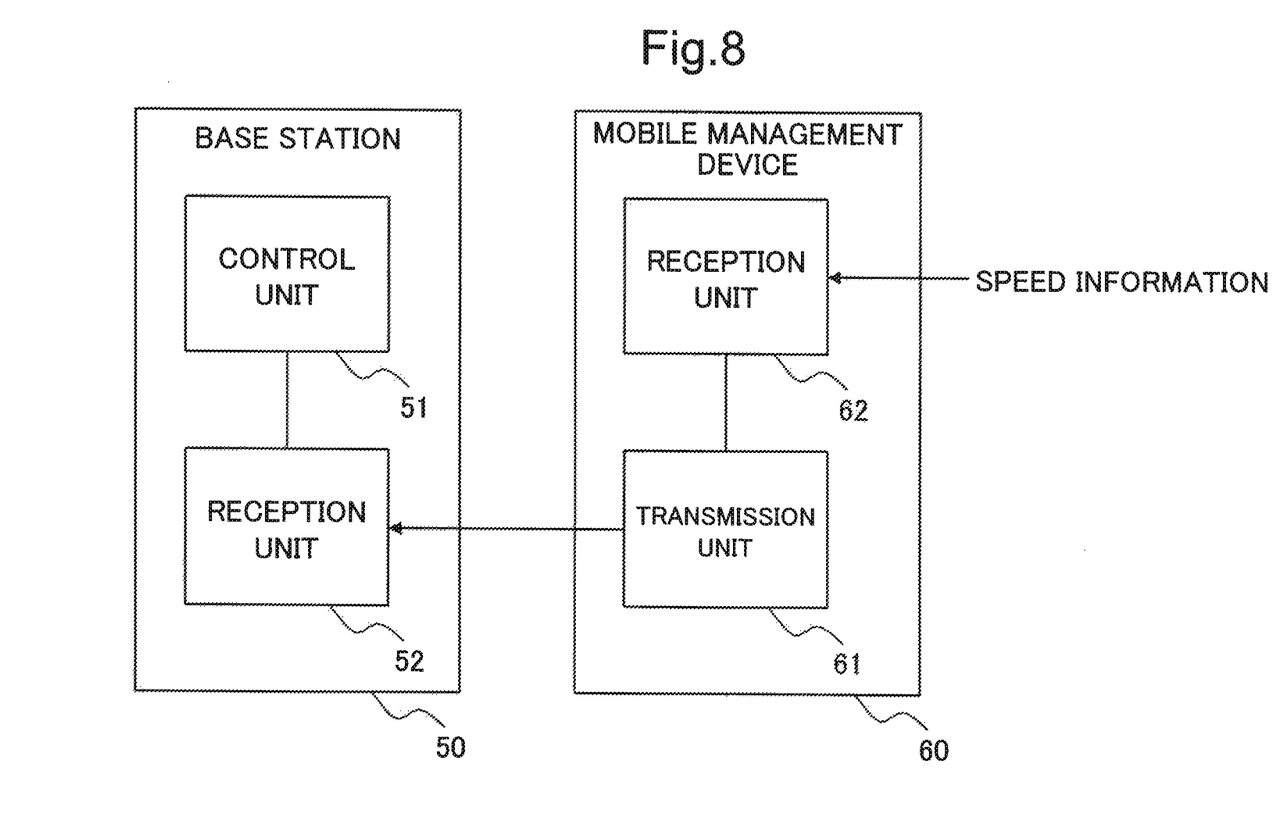
FIG. 8 is a functional block diagram illustrating an example of a functional configuration of a base station, a mobile management device of a communication system according to a second example embodiment of the present invention.

FIG. 8 is a functional block diagram illustrating an example of functional configuration of base station 50 and mobile management device 60 included in communication system 1 according to this example embodiment. As illustrated in FIG. 8, the base station 50 according to this example embodiment includes a control unit 51 and a reception unit (second reception unit) 52. Further, the mobile management device 60 includes a transmission unit (first transmission unit) 61 and a reception unit (first reception unit) 62.

Similarly to the reception unit 32 described above, the reception unit 62 in the mobile management device 60 receives the speed information on the mobile terminal based on the measurement information by the MDT from the mobile management device (TCE).

Similarly to the transmission unit 31 described above, the transmission unit 61 transmits, for example, Initial Context Setup Request (Initial Context Setup Request) including the speed information received by the reception unit 62 as an IE to the base station 50.

Similarly to the reception unit 22 described above, the reception unit 52 in the base station 50 receives a message (for example, Initial Context Setup Request) including the speed information from the mobile management device 60.

The control unit 51 executes handover control based on the speed information received by the reception unit 52.

As described above, similarly to the first example embodiment described above, the communication system 1 according to this example embodiment can execute handover according to the moving speed.

Each example embodiment described above is a preferred example embodiment of the present invention, and the scope of the present invention is not limited to each example embodiment above. Without departing from the spirit of the present invention, a person skilled in the art can modify and substitute each of the above-mentioned example embodiments and construct forms to which various changes have been applied.

This application claims priority based on Japanese Patent Application No. 2015-190572 filed on Sep. 29, 2015, the disclosure of which is incorporated herein in its entirety.

REFERENCE SIGNS LIST 1 communication system
10 user equipment
20 base station
21 transmission unit
22 reception unit
23 control unit
201 transmitter
202 receiver
203 processor
30 mobile management device
31 transmission unit
32 reception unit
33 control unit
34 storage unit
301 transmitter
302 receiver
303 processor
304 memory
40 trace collection server
41 transmission unit
42 reception unit
43 calculation unit
44 storage unit
401 transmitter
402 receiver
403 processor 404 memory
50 base station
51 control unit
52 reception unit
60 mobile management device
61 transmission unit
62 reception unit

What is claimed is:

1. A communication system comprising:
a mobile management device including:
a first receiver configured to receive speed information on a mobile terminal based on measurement information by MDT (Minimization of Driving Test), and
a first transmitter configured to transmit a message including the speed information to a base station;
the base station including:
a second receiver configured to receive the message including the speed information, and
a controller configured to execute handover control based on the speed information which is received, wherein the controller determines, based on the speed information, measurement configuration information (Measurement Configuration) which is setting information for terminal measurement of the mobile terminal;
and a trace collection server configured to collect the measurement information, wherein
the first transmitter transmits a request for the speed information to the trace collection server,
the first receiver receives the speed information on the mobile terminal based on the measurement information as a response to the request for the speed information, and
the first transmitter periodically transmits the request for the speed information to the trace collection server, and transmits a modification request to the base station when the speed information received as the response to the request is different from the speed information included in the message transmitted to the base station.

2. The communication system according to claim 1, wherein
the base station further includes a transmission unit configured to transmit a radio resource control connection reconfiguration message (RRC Connection Reconfiguration) including the measurement configuration information to the mobile terminal.

3. The communication system according to claim 1, wherein the trace collection server includes:
a calculator configured to predict a moving speed of the mobile terminal from a current time to a predetermined time later based on the measurement information, and to calculate the speed information based on the moving speed which is predicted, and
a transmitter configured to transmit the speed information which is calculated as the response to the request.

4. A control method for a communication system including a base station and a mobile management device, comprising:
receiving, by the mobile management device, speed information on a mobile terminal based on measurement information with MDT (Minimization of Driving Test); and
transmitting, by the mobile management device, a message including the speed information to the base station;
receiving, by the base station, the message including the speed information;
executing, by the base station, handover control based on the speed information which is received;
determining, based on the speed information, measurement configuration information (Measurement Configuration) which is setting information for terminal measurement of the mobile terminal,
wherein the communication system further includes a trace collection server configured to collect the measurement information, and the control method further comprises:
transmitting, by the mobile management device, a request for the speed information to the trace collection server;
receiving, by the mobile management device, the speed information on the mobile terminal based on the measurement information as a response to the request for the speed information;
periodically transmitting, by the mobile management device, the request for the speed information to the trace collection server; and transmitting, by the mobile management device, a modification request to the base station when the speed information received as the response to the request is different from the speed information included in the message transmitted to the base station.

5. The control method according to claim 4, further comprising:
transmitting, by the base station, a radio resource control connection reconfiguration message (RRC Connection Reconfiguration) including the measurement configuration information to the mobile terminal.

6. The control method according to claim 4, further comprising: predicting, by the trace collection server, a moving speed of the mobile terminal from a current time to a predetermined time later based on the measurement information, calculating, by the trace collection server, the speed information based on the moving speed which is predicted, and transmitting, by the trace collection server, the speed information which is calculated as the response to the request.

* * * * *